US006735643B2

(12) United States Patent
Chang et al.

(10) Patent No.: US 6,735,643 B2
(45) Date of Patent: May 11, 2004

(54) ELECTRONIC CARD WITH DYNAMIC MEMORY ALLOCATION MANAGEMENT

(75) Inventors: Edison Chang, Taichung (TW); Ellope Shiue, Kaohsiung (TW); Sidney Young, Hsin-Chu (TW)

(73) Assignees: C-One Technology Corp., Hsin-Chu (TW); Pretec Electronics Corp., Fremont, CA (US)

( * ) Notice: Subject to any disclaimer, the term of this patent is extended or adjusted under 35 U.S.C. 154(b) by 120 days.

(21) Appl. No.: 10/151,921

(22) Filed: May 22, 2002

(65) Prior Publication Data

US 2003/0221027 A1 Nov. 27, 2003

(51) Int. Cl.$^7$ .............................................. G06F 13/28
(52) U.S. Cl. ............................. 710/26; 710/3; 710/5; 710/7; 710/22; 710/56
(58) Field of Search ........................ 710/3, 5, 7, 22–28, 710/56

(56) References Cited

U.S. PATENT DOCUMENTS

| | | | | |
|---|---|---|---|---|
| 5,877,975 A | * | 3/1999 | Jigour et al. | 365/52 |
| 5,878,272 A | * | 3/1999 | Yanagisawa et al. | 395/823 |
| 6,185,641 B1 | * | 2/2001 | Dunnihoo | 710/56 |
| 6,209,042 B1 | * | 3/2001 | Yanagisawa et al. | 710/3 |
| 6,310,884 B1 | * | 10/2001 | Odenwald, Jr. | 370/412 |
| 6,341,328 B1 | * | 1/2002 | Heer | 711/112 |

OTHER PUBLICATIONS www.howstuffworks.com, SRAM.*
Patterson and Hennessy, Computer Organization and Design, 1998, Morgan Kaufmann Publishers, pp. 109–116.*
Newton, Harry; Newton's Telecom Dictionary; 2002; CMP Books; 18th edition.*

* cited by examiner

*Primary Examiner*—Rehana Perveen
*Assistant Examiner*—Alan Chen
(74) *Attorney, Agent, or Firm*—Bacon & Thomas, PLLC

(57) ABSTRACT

An electronic card with dynamic memory allocation management is provided, which requires only one single memory by utilizing a dynamic memory controller having a selector and a first, a second and a third base registers. A first DMA controller provides an output address added to the first base register for performing data access. A micro-controller provides an output address added to the second base register for performing data access. A second DMA controller provides an output address added to the third base register for performing data access. When the micro-controller, the first DMA controller or the second DMA controller issues an access request to the memory, the dynamic memory controller selects one of the micro-controller, and the first and second DMA controllers to access the memory based on a sequence of the access requests.

9 Claims, 5 Drawing Sheets

ELECTRONIC CARD WITH DYNAMIC MEMORY ALLOCATION MANAGEMENT

BACKGROUND OF THE INVENTION

1. Field of the Invention

The present invention relates to an electronic card and more particularly to an electronic card with dynamic memory allocation management.

2. Description of Related Art

With the advance of electronic technology, various electronic devices, such as notebook computers, palm computers, PDAs (personal digital assistants), are getting smaller in size. These diminutive electronic devices provide a great convenience to the user due to their portability and data processing capability. However, because of their small size, such an electronic device generally only has basic processing circuit, whereas other circuit modules, such as add-on memory, modem, network card, etc., are provided to the electronic device by inserting a corresponding electronic card therein. This electronic card can also be inserted into a personal computer for enabling data communication or storage function.

Conventionally, such an electronic card is composed of a control chip and a corresponding data processing module. With reference to FIG. 1, there is shown the circuit of a memory card 10, which includes a control chip 11 and a data storage module 12. The data storage module is preferably a flash memory card. In the memory card 10, the control chip 11 is provided to control the data exchange between the data storage module 12 and a computer device 19 (such as a card reader, an USB device, or a personal computer) inserted with the memory card 10, wherein the flash memory must be erased before writing data thereto. Furthermore, when interfacing with the computer device 19, the card related information, such as CIS (Card Information Structure) for PCMCIA (Personal Computer Memory Card International Association), must be kept. Therefore, in the control chip 11, various memory blocks must be provided, including a dual-port SRAM (Static Random Access Memory) block 111 for buffering data, a CIS memory block 112 for storing the CIS of the memory card 10, a register memory block 113 for having the microprocessor execute instructions, and a data memory block 114 for having the microprocessor store data.

Because there are a plurality of memory blocks in the control chip 11 and each memory block has its own decoding logic, these memory blocks and decoding logics will need a lot of spaces in the control chip. As a result, it is difficult to miniaturize the electronic card and to reduce cost. Therefore, it is desirable to provide a novel electronic card to mitigate and/or obviate the aforementioned problems.

SUMMARY OF THE INVENTION

An objective of the present invention is to provide an electronic card with dynamic memory allocation management, which requires only one memory block be partitioned into a plurality of blocks whose sizes and functions can be dynamically adjusted for reducing the occupied space.

Another objective of the present invention is to provide an electronic card with dynamic memory allocation management, wherein the dynamically adjustable memory can be arbitrarily accessed by any controller or be accessed by multiple controllers at the same time.

To achieve the above and other objectives, the electronic card with dynamic memory allocation management includes: a memory; a dynamic memory controller, which is coupled to the memory and has a selector, and at least a first base register, a second base register and a third base register; a first DMA controller, which is coupled to the dynamic memory controller, and provides an output address to be added to a base value of the first base register for retrieving data to or from the memory; a micro-controller, which is coupled to the dynamic memory controller and provides an output address to be added to a base value of the second base register for retrieving data to or from the memory; and a second DMA controller, which is coupled to the dynamic memory controller and provides an output address to be added to a base value of the third base register for retrieving data to or from the memory; wherein, when the micro-controller, the first DMA controller or the second DMA controller issues an access request to the memory, the dynamic memory controller controls the selector to select one of the micro-controller, the first DMA controller, and the second DMA controller for accessing the memory.

Other objectives, advantages, and novel features of the invention will become more apparent from the detailed description when taken in conjunction with the accompanying drawings.

DETAILED DESCRIPTION OF THE PREFERRED EMBODIMENT

Figure 1:
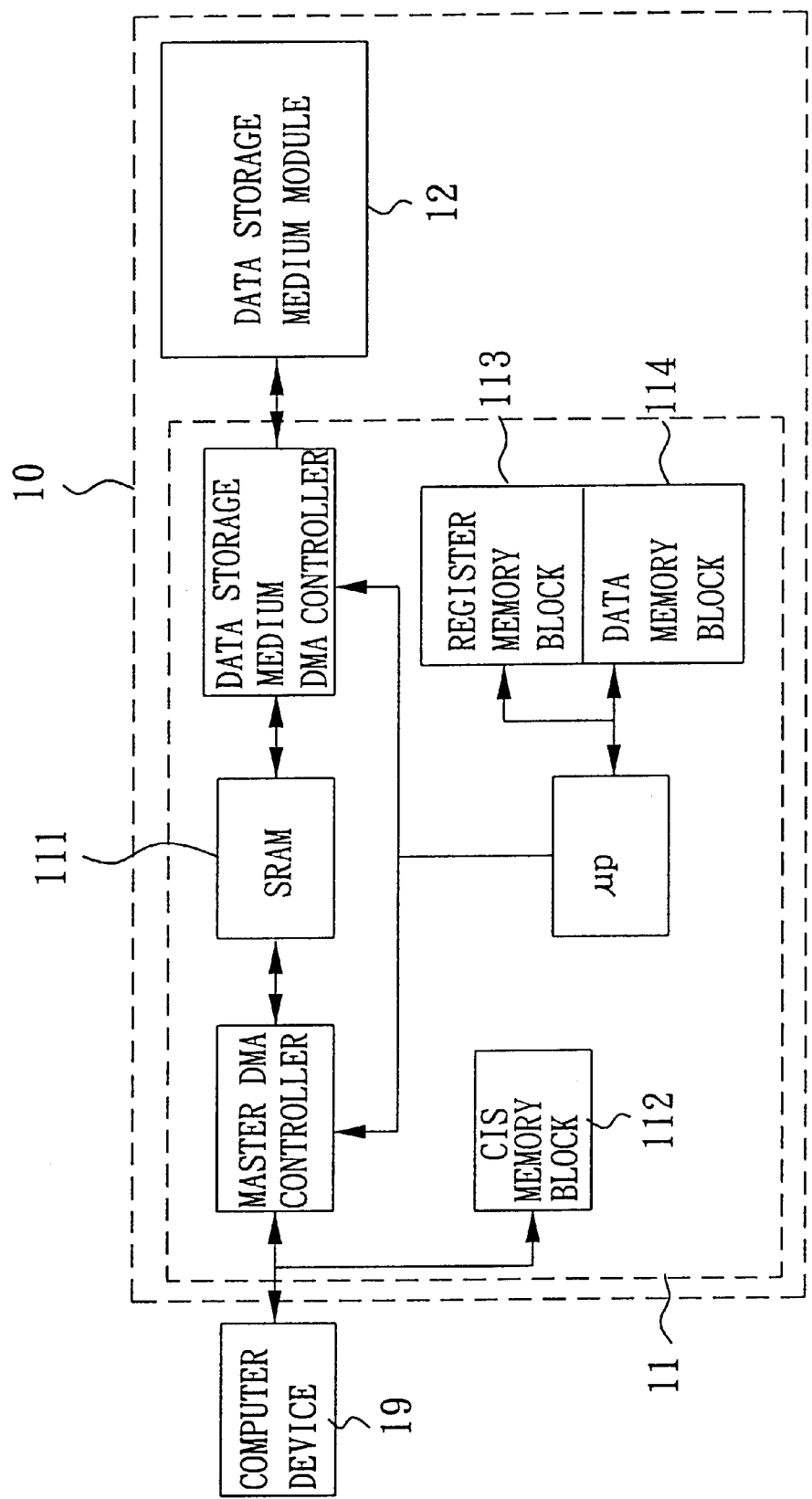
FIG. 1 is a block diagram of a conventional memory card.
Figure 2:
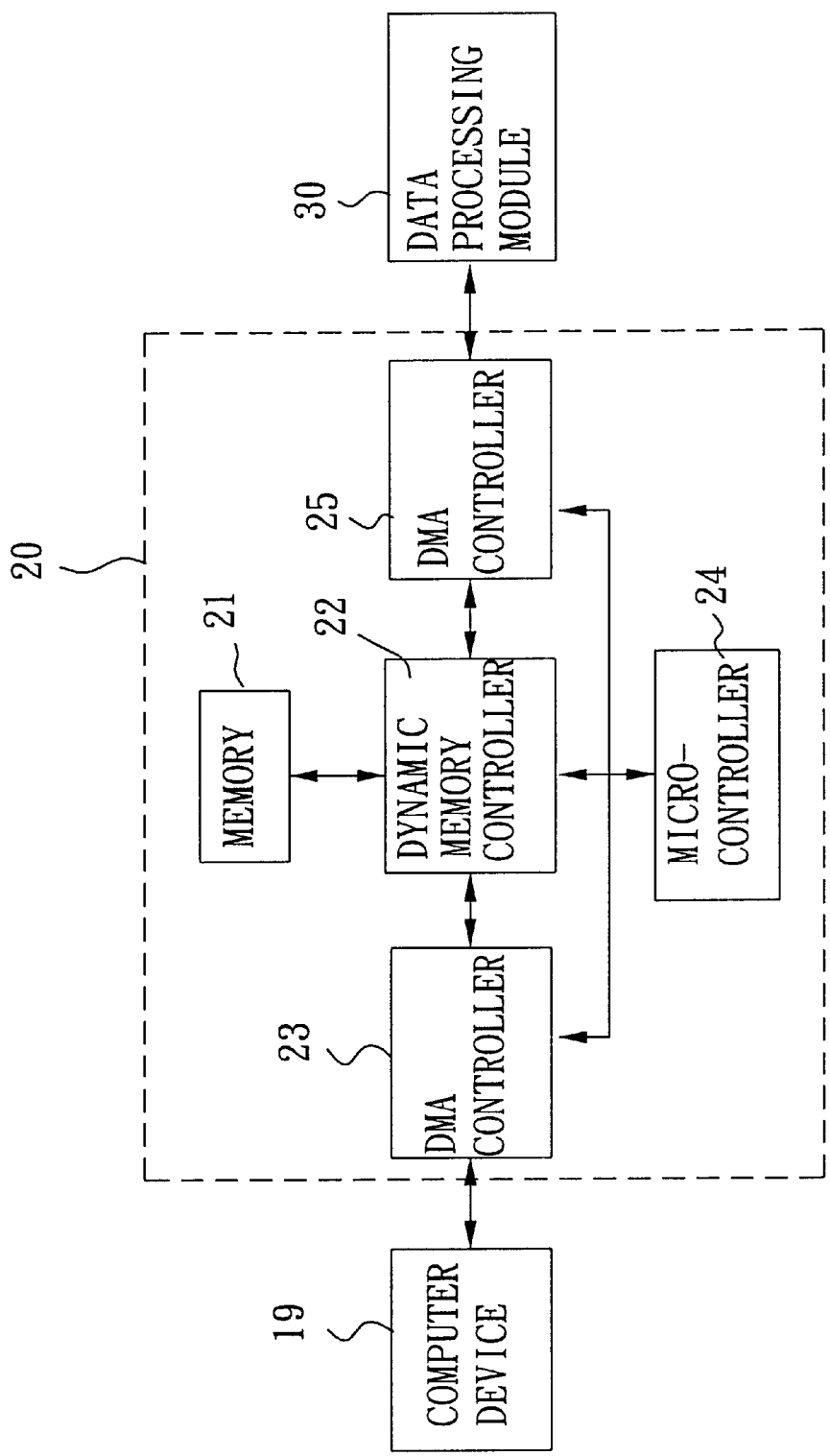
FIG. 2 is the block diagram of an electronic card with dynamic memory allocation management in accordance with the present invention.

With reference to FIG. 2, there is shown an electronic card with dynamic memory allocation management in accordance with the present invention, which includes a control chip 20 and a data processing module 30. The control chip 20 includes a memory 21, a dynamic memory controller 22, a first DMA (direct memory access) controller 23, a micro-controller 24, and a second DMA control 25. The memory 21 is, for example, a SRAM having address lines (Addr), data input lines (Data_in), and data output lines (Data_out) for accessing data from a specific address of memory.

The first DMA controller 23 is coupled to the dynamic memory controller 22, and is controlled by the micro-controller 24 to perform a direct memory access between the electronic card and a computer device 19 inserted with the electronic card. The second DMA controller 25 is also coupled to the dynamic memory controller 22, and is controlled by the micro-controller 24 to direct memory access to the data processing module 30 in the electronic card. In this preferred embodiment, the electronic card is a CF (compact flash) card, and data processing module 30 is a flash memory module. In addition to controlling the first and second DMA controllers 23 and 25, the micro-controller 24 is also coupled to the dynamic memory controller 22. The above first and second DMA controllers 23 and 25 and the micro-controller 24 only access a single memory 21 via the management of the dynamic memory controller 22.

Figure 3:
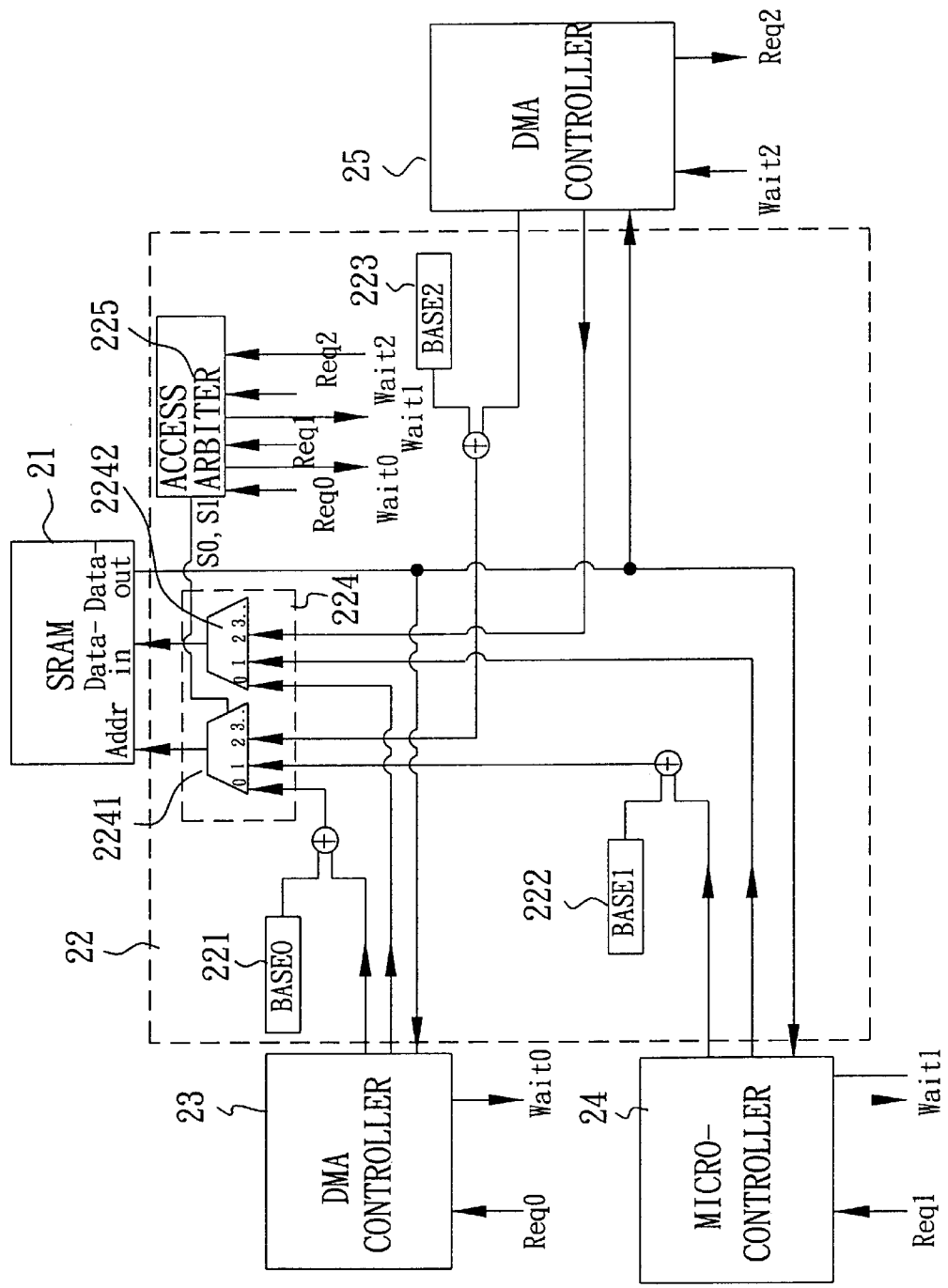
FIG. 3 is the circuit diagram of the electronic card with dynamic memory allocation management in accordance with the present invention.
Figure 4:
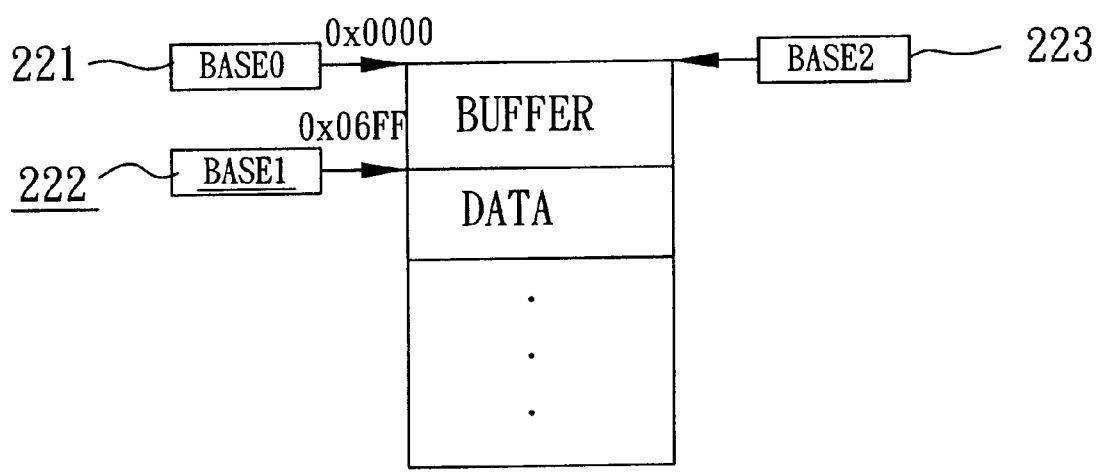
FIG. 4 shows a memory allocation example in accordance with the present invention.

With reference to FIG. 3, there is shown the circuit diagram of the dynamic memory controller 22, which includes a first base register 221, a second base register 222, a third base register 223, a selector 224, and an access arbiter 225. The first, second, and third base registers 221, 222 and 223 can be programmed by the micro-controller 24 to have the same or different base values. The output address of the first DMA controller 23 is added to the base value of first base register 221 for being fed to the address lines of the memory 21 via the selection of the selector 224. The output address of the micro-controller 24 is added to the base value of second base register 222 for being fed to the address lines of the memory 21 via the selection of the selector 224. The output address of the second DMA controller 25 is added to the base value of the third base register 223 for being fed to the address lines of the memory 21 via the selection of the selector 224. Therefore, by programming the first, second, and third base registers 221, 222 and 223, it is able to partition a single memory 21 into a plurality of memory blocks for being used by the first and second DMA controls 23 and 25 and the micro-controller 24, respectively. An example of such a memory allocation is shown in FIG. 4, wherein the first and third base registers 221 and 223 are programmed to have the value of 0x0000, and the second base register 222 is programmed to have a value of 0x06FF. Therefore, the area between addresses 0x0000 and 0x06FF is programmed as a memory buffer block for being used by the first and second DMA controllers 23 and 25. Also, a data memory block starting from address 0x06FF is programmed for being used by the micro-controller 24.

With reference to FIG. 3 again, the data input lines (Data_in) of the memory 21 receives the output data from one of the first and second DMA controllers 23 and 25, and the micro-controller 24 via the selection of the selector 224. The data output lines (Data_out) of the memory 21 are direct coupled to the first and second DMA controllers 23 and 25, and the micro-controller 24. The selector 224 includes a first multiplexer 2241 and a second multiplexer 2242. The first multiplexer 2241 has a plurality of input pins for receiving the address output from adding the output addresses of the first and second DMA controllers 23 and 25 and the micro-controller 24 to the base values of the corresponding base registers 221~223, respectively. The output pin of the first multiplexer 2241 is connected to the address lines of the memory 21. The second multiplexer 2242 has a plurality of input pins for receiving the data output of the first and second DMA controllers 23 and 25 and the micro-controller 24. The output pin of the second multiplexer 2242 is connected to the data input lines of the memory 21.

Figure 5:
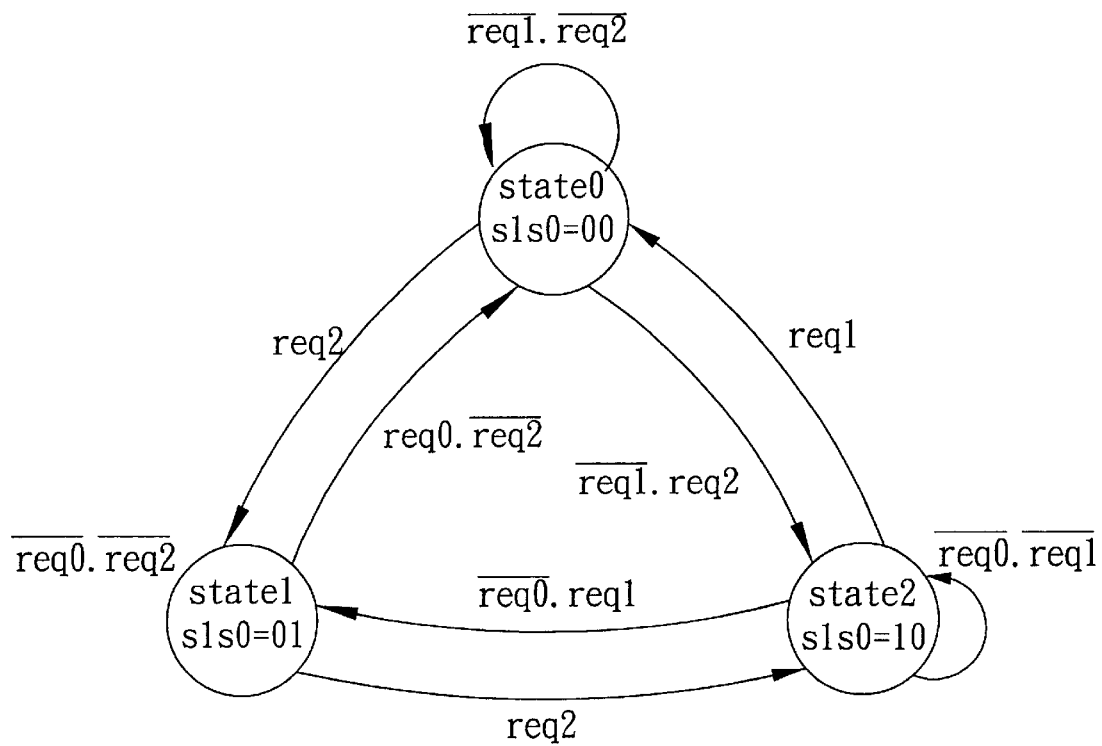
FIG. 5 is a state diagram of an access arbiter in accordance with the present invention.

Each of the first and second multiplexers 2241 and 2242 is controlled by the outputs S0 and S1 of the access arbiter 225 for switching one of the input pins to connect to the output pin. The access arbiter 225 controls the selector, based on the sequence of the access requests Req0, Req2, and Req1 from the first and second DMA controllers 23 and 25 and the micro-controller 24, to select one of the first and second DMA controllers 23 and 25 and the micro-controller 24 for performing data access to the memory 21, and issues wait signals Wait0~2 to notify the unselected controller to wait for the next cycle to access data. The state diagram of the access arbiter 225 is illustrated in FIG. 5 in detail.

In the control chip 20 of the above embodiment, the memory 21 is accessed by the first and second DMA controllers 23 and 25 and the micro-controller 24. However, in practical application, the control chip 20 may have more than three controllers for accessing the memory 21. In response, more than three base registers are provided in the dynamic memory controller 22 corresponding to the controllers. The configuration of such an electronic card is analogous to that of the previous embodiment by simply expanding the three base registers to N base registers (N>3), and thus a detailed description is deemed unnecessary.

In view of the foregoing, it is known that the present invention is able to integrate multiple memory blocks, as employed in the conventional electronic card, into a single memory by utilizing the dynamic memory controller 22, so as to provide several advantages as follows:

(1) Only one SRAM is required and thus the number of decoders is decreased, thereby increasing the performance of the electronic card and reducing the cost of the chip.

(2) The size and function of each memory block in the SRAM can be dynamically adjusted.

(3) Any controller can access SRAM without waiting for each other, thereby increasing the transmission bandwidth.

(4) Multiple controllers can access one SRAM at the same time.

(5) No dual-port SRAM is required.

Although the present invention has been explained in relation to its preferred embodiment, it is to be understood that many other possible modifications and variations can be made without departing from the spirit and scope of the invention as hereinafter claimed.

What is claimed is:

1. An electronic card with dynamic memory allocation management, comprising:

a memory having data input lines;

a dynamic memory controller, which is coupled to the memory and has a selector, and at least a first base register, a second base register and a third base register;

a first DMA controller, which is coupled to the dynamic memory controller, and provides an output address to be added to a base value of the first base register for retrieving data to or from the memory;

a micro-controller, which is coupled to the dynamic memory controller and provides an output address to be added to a base value of the second base register for retrieving data to or from the memory;

a second DMA controller, which is coupled to the dynamic memory controller and provides an output address to be added to a base value of the third base register for retrieving data to or from the memory;

wherein, when the micro-controller, the first DMA controller or the second DMA controller issues an access request to the memory, the dynamic memory controller controls the selector to select one of the micro-controller, the first DMA controller or the second DMA controller, for accessing the memory respectively, such that output data from the first DMA controller, the second DMA controller or the micro-controller is received by the data lines of the memory via the selector, which further includes:

a first multiplexer having a plurality of input pins for receiving address output from adding output addresses of the first DMA controller, the second DMA controller and the micro-controller to base values of the corresponding base registers, respectively, and an output pin connected to address lines of the memory; and a second multiplexer having a plurality of input pins for receiving data output of the first DMA controller, the second DMA controller and the micro-controller, respectively, and an output pin connected to the data input lines of the memory.

2. The electronic card with dynamic memory allocation management as claimed in claim 1, wherein the dynamic memory controller further comprises an access arbiter for controlling each one of the first and the second multiplexers to switch one of the input pins to connect to the output pin.

3. The electronic card with dynamic memory allocation management as claimed in 2, wherein the access arbiter controls the selector to select one of the micro-controller, the first DMA controller, and the second DMA controller for accessing the memory based on a sequence of the access requests.

4. The electronic card with dynamic memory allocation management as claimed in claim 3, wherein the access arbiter issues wait signals to notify unselected controllers to wait for a next cycle to access data.

5. The electronic card with dynamic memory allocation management as claimed in claim 2, wherein the first, the second, and the third base registers are programmed by the micro-controller to have the same or different base values.

6. The electronic card with dynamic memory allocation management as claimed in claim 2, wherein the data output lines of the memory are directly coupled to the first DMA controller, the second DMA controller, and the micro-controller.

7. The electronic card with dynamic memory allocation management as claimed in claim 1, wherein the memory is a static random access memory.

8. The electronic card with dynamic memory allocation management as claimed in claim 1, further comprising a data processing module capable of being direct memory accessed by the second DMA controller.

9. The electronic card with dynamic memory allocation management as claimed in claim 1, wherein the data processing module is a flash module.

\* \* \* \* \*